United States Patent
Gallagher

(10) Patent No.: US 9,457,985 B1
(45) Date of Patent: Oct. 4, 2016

(54) CONTROLLING SPINDLE TENSION

(71) Applicant: James L. Gallagher, Inc., Little Compton, RI (US)

(72) Inventor: James L. Gallagher, Little Compton, RI (US)

(73) Assignee: James L. Gallagher, Inc., Little Compton, RI (US)

(*) Notice: Subject to any disclaimer, the term of this patent is extended or adjusted under 35 U.S.C. 154(b) by 545 days.

(21) Appl. No.: 13/792,742

(22) Filed: Mar. 11, 2013

Related U.S. Application Data

(60) Provisional application No. 61/610,810, filed on Mar. 14, 2012.

(51) Int. Cl.
*B65H 59/04* (2006.01)
*B65H 49/18* (2006.01)

(52) U.S. Cl.
CPC .............. *B65H 59/04* (2013.01); *B65H 49/18* (2013.01)

(58) Field of Classification Search
USPC ........................................................ 242/421
See application file for complete search history.

(56) References Cited

U.S. PATENT DOCUMENTS

| 1,944,916 A | 1/1934 | Beaver et al. |
| 5,405,485 A * | 4/1995 | Henderson et al. .......... 156/425 |
| 8,628,037 B2 | 1/2014 | Slezak |

OTHER PUBLICATIONS

Riesselmann, George. "Applying Fail-safe Brakes to Stop and Hold." Machine Design. Feb. 1, 2000.*
Oriental Motor. "The Basics of Step Motors." Motion Control 101—Basics of Motion Control. May 27, 2010.*
"CTA—Compact Torque Actuator", http://honigmann.com/i459/CTA-Compact-Torque-Actuator-Hysteresis-Brake.html; Accessed May 22, 2014; 2 pages.

* cited by examiner

*Primary Examiner* — William E Dondero
(74) *Attorney, Agent, or Firm* — BainwoodHuang

(57) ABSTRACT

A technique for maintaining tension on fiber drawn from a spindle includes incorporating a permanent magnet brake into a spindle and controlling tension of fiber paid out from the spindle by rotating an adjustment plate of the permanent magnet brake with a motor. In some examples, a motor (e.g., a stepper motor) is coupled to the adjusting plate of the permanent magnet motor through a set of gears, a timing belt, or a similar transmission medium. Mechanical advantage afforded through gear reduction allows a very small motor to control a large amount of braking torque. Motor control may be accomplished for multiple spindles with little power.

14 Claims, 7 Drawing Sheets

CONTROLLING SPINDLE TENSION

This application claims the benefit of U.S. Provisional Application No. 61/610,810, filed Mar. 14, 2012, which is hereby incorporated by reference in its entirety.

BACKGROUND

The manufacturing of composite parts often requires placing many fibers in desired orientations and/or positions. Manufacturers typically obtain fibers in the form of "packages," i.e., spools wound with fiber, which the manufacturers mount onto spindles to payout the fibers. The fibers can be converted into fabrics or tapes, or can be positioned directly onto the composite parts during manufacturing.

One variable in the process of dispensing fibers from spools is back tension in the fibers. Many approaches are known for applying back tension to fibers. One common approach is to apply a braking torque to a spindle on which the package is mounted. An electrically operated brake may be employed, along with associated controllers and wiring, to accomplish the desired braking. In this arrangement, braking torque is regulated by changing a voltage or current to a braking assembly. The amount of braking torque is proportional to the electrical power supplied.

Another approach for tensioning fiber is to use a permanent magnet brake. Braking torque produced by a permanent magnet brake is adjusted by manually rotating an adjusting plate of the permanent magnet brake. As adjustments are manual, no power source is generally required. Other means of applying braking torque include the use of spring loaded friction pads, leather belts, or air operated (pneumatic) brakes.

SUMMARY

Unfortunately, conventional, electrically operated brakes require electrical power to be supplied at all times that the brakes are in operation. Where many spindles are used, power requirements and design complexity can become high. Complexity and expense can become even greater when spindles are mounted on rotating equipment, such as an orbital winder. In such cases, it is often necessary to mount multiple controllers on a rotating unit and supply the rotating unit with electrical power using slip rings. A complex arrangement of controllers driving multiple spindles can require a large number of slip rings. Conventional permanent magnet brakes require manual adjustments to obtain a certain braking force and are thus ill-suited for use while a rotating machine is running. Nevertheless, it would be desirable to provide a low power and inexpensive technique for adjusting fiber back tension as fiber is being paid out from a spindle, e.g., while a rotating machine is being operated.

In contrast with prior approaches, an improved technique for maintaining tension on fiber drawn from a spindle includes incorporating a permanent magnet brake into a spindle and controlling tension of fiber paid out from the spindle by rotating an adjustment plate of the permanent magnet brake with a motor. In some examples, a stepper motor is coupled to the adjustment plate of the permanent magnet motor through a set of gears, a timing belt, or a similar transmission medium. Mechanical advantage afforded through gear reduction allows a very small and low power motor to control a large amount of braking torque. Power requirements and the associated complexity of conveying large amounts of power to rotating machines are thus reduced or avoided altogether.

Certain embodiments are directed to an apparatus for dispensing fiber. The apparatus includes a permanent magnet brake having a housing, a brake shaft extending from the housing, and an adjustment plate. The adjustment plate has an angle with respect to the housing, and the angle is adjustable to vary a braking torque of the permanent magnet brake. A spindle is coupled to the brake shaft for paying out fiber as the fiber is drawn from the spindle. A stepper motor having a motor shaft is coupled to the adjustment plate for varying the angle of the adjustment plate with respect to the housing and thereby to adjust the back tension on the fiber as the fiber is drawn from the spindle.

Other embodiments are directed to a method of dispensing fiber from a spindle. The method includes receiving stepper motor drive signals, varying an angular position of a stepper motor shaft in response to the stepper motor drive signals, and varying, in response to the angular position of the stepper motor shaft, an angular position of an adjustment plate of a permanent magnet brake relative to a housing of the permanent magnet brake, to vary the back tension on a fiber being paid out from a spindle coupled to the permanent magnet brake.

Still other embodiments are directed to a method of dispensing fiber. The method includes receiving, by a main control unit mounted to a serving plate of an orbital winder, a wireless signal designating a braking profile for paying out fiber from multiple spindles of the orbital winder. The method further includes transmitting profile information including at least a subset of the braking profile to each of multiple motor control units on the serving plate of the orbital winder, and generating, by each motor control unit in response to the profile information transmitted to the motor control unit, stepper motor drive signals for each of the spindles. The method further includes, for each of the spindles, receiving the stepper motor drive signals, varying an angular position of a stepper motor shaft in response to the stepper motor drive signals, and varying, in response to the angular position of the stepper motor shaft, an angular position of an adjustment plate of a permanent magnet brake relative to a housing of the permanent magnet brake, to vary the back tension on a fiber being paid out from a spindle coupled to the permanent magnet brake.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for maintaining tension on fiber drawn from a spindle includes incorporating a permanent magnet brake into a spindle and controlling tension of fiber paid out from the spindle by rotating an adjustment plate with the use of a motor.

Figure 1:
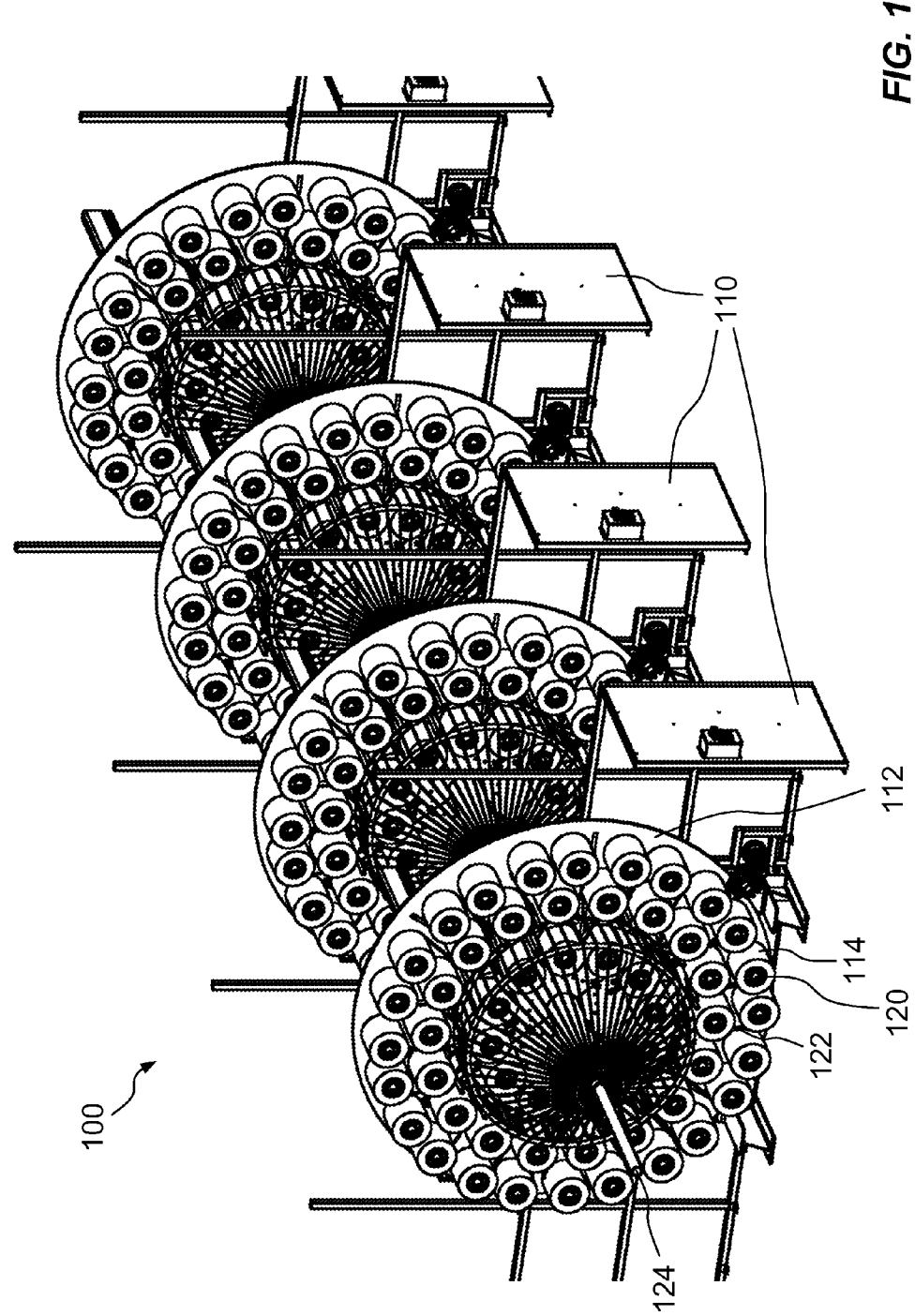
FIG. 1 shows an example orbital winder that includes multiple stages of serving plates rotating in alternating directions to wind fiber from numerous spindles onto a product, such as a pipe, which is advanced relative to the serving plates, and which, in some examples, is later impregnated with epoxy resin to form a high-pressure pipe.

FIG. 1 shows an example orbital winder 100 having multiple stages 110. Each stage includes a serving plate 112. Multiple spindles 120 are mounted to each serving plate 112. Each spindle 120 is loaded with a package 114, which includes a spool containing wound fiber 122. In operation, a product 124, such as a pipe, is advanced through a central axis of the orbital winder 100, and the serving plates 112 are rotated in alternating directions. As the product 124 is advanced, each of the rotating serving plates 112 winds fiber 122 from multiple spindles 120 onto the product 124.

Maintaining proper tension on the fiber 122 results in a more reliable product 124 and enables the product 124 to meet its specifications. With proper tension, fibers 122 are placed with well-organized position and orientation, and are spaced on the product 124 such that, for example, later-applied resin can penetrate the product 124 and produce a uniform result. In an example, each spindle 120 on the orbital winder 100 includes a permanent magnet brake to control fiber back tension.

Figure 2:
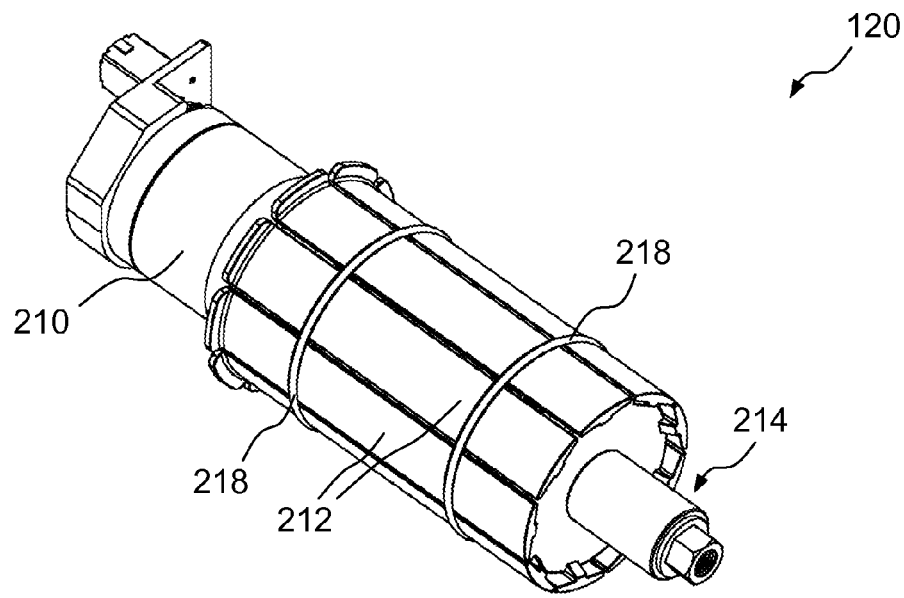
FIG. 2 shows an example spindle for receiving spools of fiber and dispensing the fiber with controlled torque supplied by a permanent magnet brake having a stepper motor that electrically controls the position of an adjustment plate within the brake to vary a braking torque applied by the brake.
Figure 3:
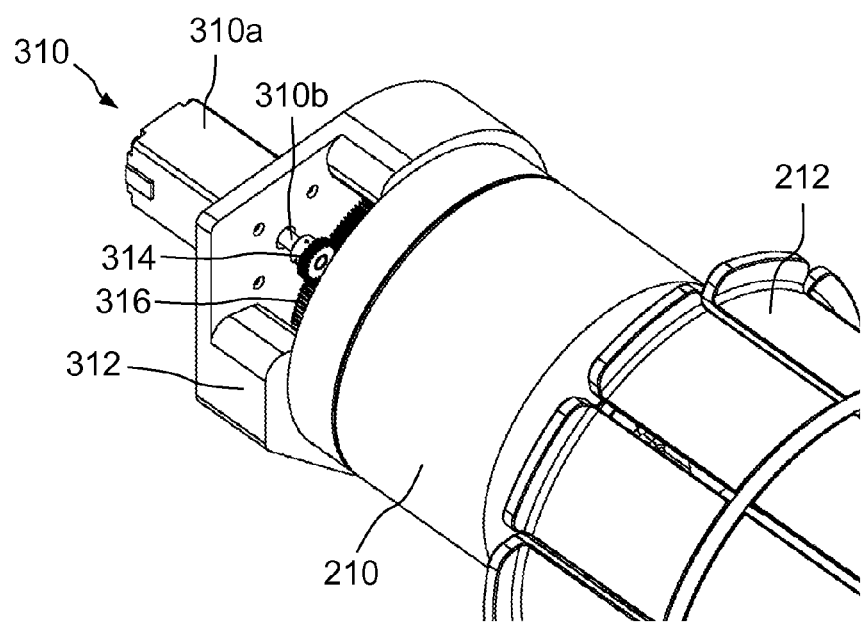
FIG. 3 is an enlarged view of the spindle showing the brake, stepper motor, and gears in additional detail.
Figure 4:
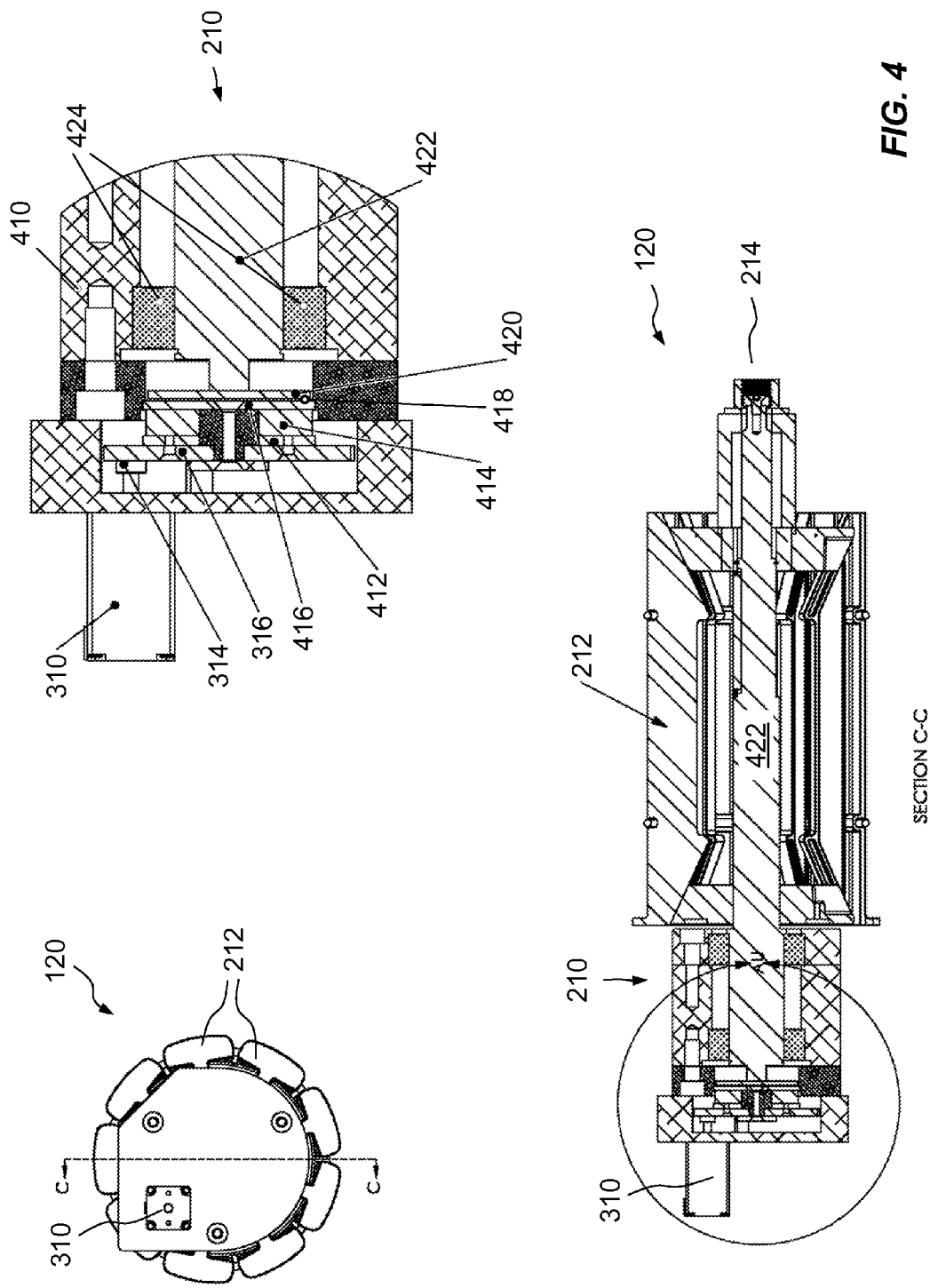
FIG. 4 shows additional views of the spindle, including the brake, the stepper motor, and the gears.

FIGS. 2-4 show different views of a permanent magnet brake 210 mounted to a spindle 120. As shown in FIG. 2, the spindle 120 includes an expanding set of collet segments 212. The position of the collet segments 212 can be controlled via an adjustment mechanism 214. When the adjustment mechanism 214 is advanced, the collet segments 212 expand outwardly. When the adjustment mechanism 214 is withdrawn, the collet segments 212 contract inwardly. The position of the adjustment mechanism 214 can be fixed by tightening a set screw (not shown). Elastic bands 218 extend around the collet segments 212 to hold them in place. The collet segments 212 may be adjusted to allow a spool of fiber to be loaded onto the spindle 120 and held in place.

As shown in FIG. 3, a stepper motor 310 is attached to the permanent magnet brake 210. The stepper motor 310 has a housing 310a and a shaft 310b. The shaft 310b is coupled to a first spur gear 314, which is engaged with a second spur gear 316. The second spur gear 316 is coupled to an adjustment plate 412 of the permanent magnet brake (See FIG. 4). In response to electrical pulses, the stepper motor 310 rotates the shaft 310a, which in turn rotates the spur gears 314 and 316 to effect rotation of the adjustment plate 412.

As shown in FIG. 4, the adjustment plate 412 ("steel backing plate") includes or is mounted to a permanent magnet 414, such that rotating the adjustment plate 412 rotates the permanent magnet 414. A flux gate 416 is mounted within the housing 410 of the brake 210 and is held in a fixed rotational position relative to the housing 410. A disc 420, e.g., made of steel, is disposed a short distance from the permanent magnet 414, such that a small gap 418 remains between the permanent magnet 414 and the disc 420. The disc 420 is fixedly coupled to the brake shaft 422, and the disc 420 and the brake shaft 422 rotate together on bearings 424. By rotating the adjustment plate 412 via action of the stepper motor 310, the permanent magnet 414 is rotated, causing variable levels of magnetic flux to pass through the flux gate 416 and into the disc 420. The variable magnetic flux results in variable amounts of magnetic braking torque applied to the brake shaft 422 and thus to the spindle 120.

The permanent magnet brake 210 effects large changes in braking torque through changes in the position of the adjustment plate 412. Further, the adjustment plate 412 can be rotated with very low energy, such that a small, low-power stepper motor may be used to control it. Once a desired value of braking torque is achieved, the stepper motor 310 requires no power to hold a fixed position. Thus, power is required only when changing braking torque but not when holding a previously set value.

Figure 5:
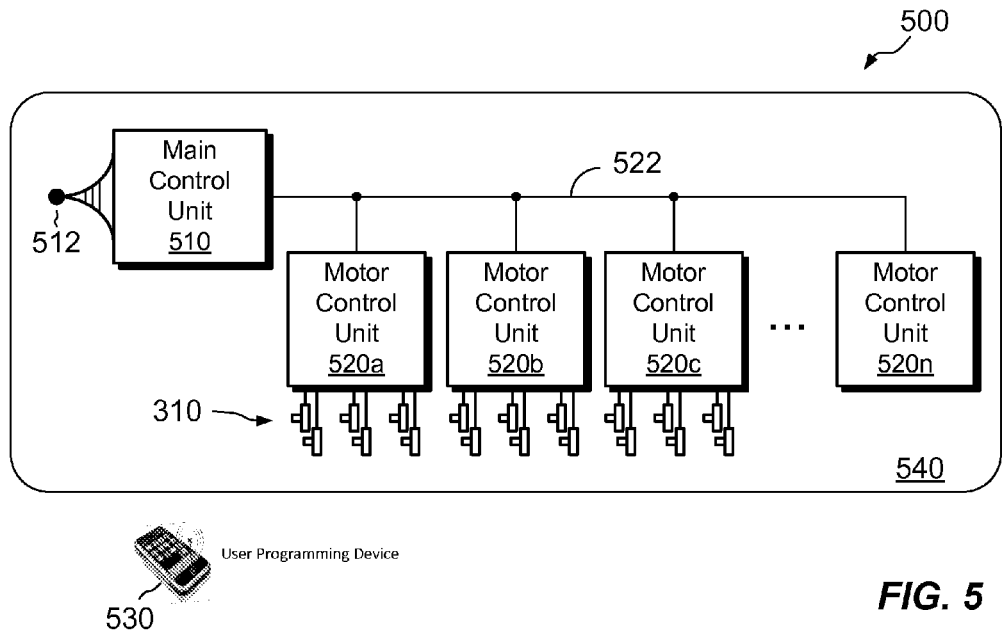
FIG. 5 is a block diagram showing an example control topology for controlling the application of braking torque of numerous spindles, including a main control unit and a number of motor control units.

FIG. 5 shows an example control system 500 for individually controlling the braking of multiple spindles 120, for example, all spindles 120 provided on a serving plate 112 of the orbital winder 100. The control system 500 includes a main control unit 510 coupled to multiple motor control units 520a-n over a communications network 522. Each motor control unit 520a-n controls one or more (typically several) stepper motors 310, where each stepper motor 310 is attached to a permanent magnet brake 210 for controlling back tension on fiber paid out from a spindle 120 to which the brake 210 is attached.

In an example, the main control unit 510, the motor control units 520a-n, the communication network 522, and the motors 310 (shown collectively as group 540) are all provided on a serving plate 112 of the orbital winder 100 and thus all rotate together as the serving plate 112 rotates. Power to operate these components may be provided, for example, via a pair of slip rings (not shown) conveying low voltage (e.g., 24 VDC) to the serving plate 112. As power requirements to operate the stepper motors 310 are relatively small, power may alternatively be supplied from a set of batteries mounted to the serving plate 112.

In an example, the main control unit 510 includes an antenna 512 for communicating wirelessly with a user programming device 530, such as a computer, smart phone, or tablet computer, for example. Depending on implementation, a separate wireless router (not shown) may also be used. The user programming device 530 is generally operated by a human user and thus is generally not part of the rotating group 540 of components. In an example, the user programming device 530 sends a braking profile to the main control unit 510. The main control unit then 510 directs the motor control units 520*a-n* to adjust the stepper motors, e.g., on an individual basis, to provide back tension in accordance with the braking profile. Also, each of the motor control units 520*a-n* generates status information, which the motor control units 520*a-n* send over the network 522 to the main control unit 510. The main control unit 510 may then wirelessly sends the status information to the user programming device 530 for monitoring.

The control system 500 has the ability to control each motor 310 independently based on user setting, payout distance, and/or torque feedback depending on the selected mode. The control system 500 incorporates a multi-level design where the main controller 510 handles the dispatching of recipe data containing the desired braking profile to the motor control units 520*a-n*, which control the motor position. In an example, a user defines the desired braking torque for each spindle using built-in software editing tools and saves this information as a recipe that may be downloaded to the main controller 510 on command. This feature allows for fast and convenient product setup and changeover.

Figure 6:
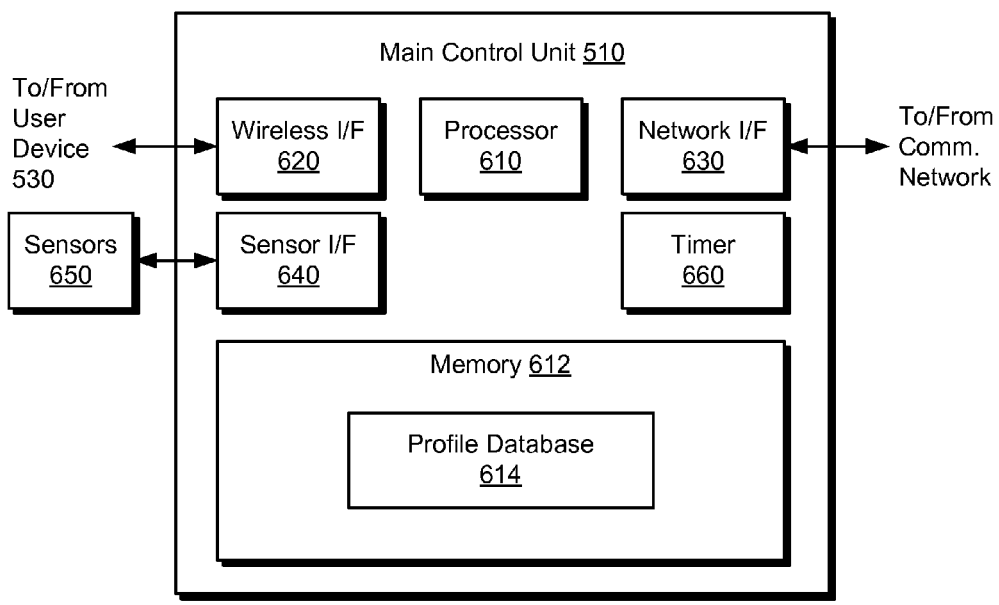
FIG. 6 is a block diagram of an example main control unit of FIG. 5.

FIG. 6 shows an example main control unit 510 in greater detail. Here, it is seen that the main control unit 510 includes a processor 610 (e.g., a microprocessor or other CPU), a wireless interface 620, a network interface 630, a sensor interface 640, and memory 612. The memory 612 includes a profile database 614, which stores the braking profile received from the user programming device 530 over the wireless interface 620. The sensor interface 640 is coupled to sensors 650 for receiving sensor input. The sensors may include, for example, torque sensors on the individual motors 210, tension sensors on the fiber 122, and/or sensors which count the number of revolutions of the serving plate 112.

In an example, the braking profile specifies a range of braking torques to be supplied by the permanent magnet brakes 210 as fiber 122 is paid out. Generally, the braking torque required to maintain constant tension on a fiber decreases as the diameter of the package 114 from which the fiber is drawn decreases. Thus, to maintain constant tension on the fiber 122, the braking profile generally specifies an initially high braking torque for a full package 114 and gradually diminishing braking torques as fiber is paid out. When multiple packages 114 dispense fiber at the same time from the same serving plate 112 of the orbital winder 100, the rate at which fiber is dispensed is approximately the same for all packages 114. Thus, assuming all packages 114 have the same geometry, all packages 114 can generally use the same braking profile. In an example, fiber is dispensed from the packages 114 at a relatively slow rate, such that the braking profile may specify reductions in braking torque at a rate of approximately once per minute.

In an example, the main control unit 510 has a timer 660. Each minute, or at some other suitable rate, as marked by the timer 660, the main control unit 510 sends a new braking torque value to each of the motor control units 520*a-n*. In an example, the braking torque values are expressed in the form of stepper motor positions (i.e., numbers of clicks or indexes) from a preset starting position. The motor control units 520*a-n* then realize new braking torque values by rotating the shafts 310*b* of their respective stepper motors 310 to the designated number of clicks, which in turn rotates the adjustment plates 412 on the permanent magnet brakes 210 and thus changes the braking torque. In further examples, the number of clicks sent to the stepper motors 310 are expressed simply as differences from a previous settings (e.g., −4, −6, etc.), where each difference indicates the number and direction of clicks in which the stepper motor 310 should be rotated.

In some examples, the sensors 650 include a revolution sensor, coupled to the sensor interface 640, for measuring the number of revolutions of the serving plate 112. As the number of revolutions is proportional to the linear amount of fiber paid out from the packages 114, the revolution sensor can be used in place of time as a basis for adjusting the braking torque on the spindles 120. For example, the main control unit 510 can be programmed to reduce the braking torque by 5% every 100 revolutions of the serving plate 112.

In yet another example, the control system 500 receives user-specified settings, which set braking torque according to user preference. The user-specified settings can be used independently or in connection with the timer or the revolution counter, to vary fiber tension over time in a user-specified manner.

Figure 7:
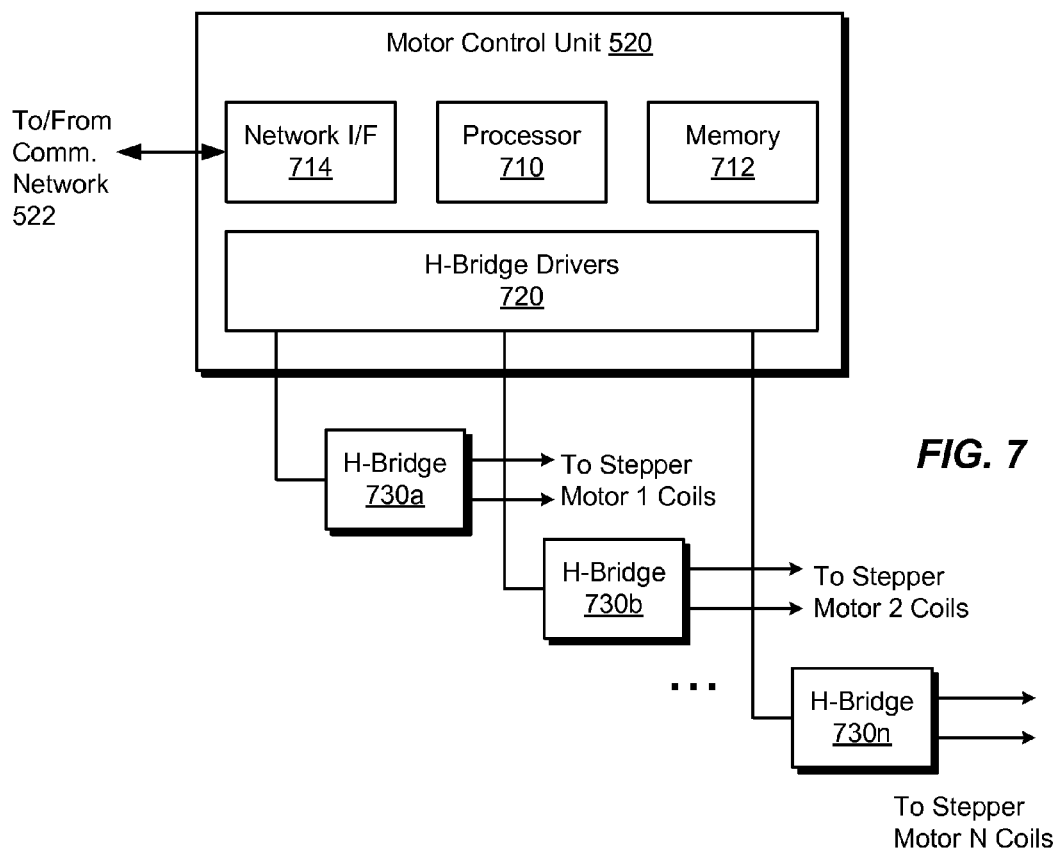
FIG. 7 is a block diagram of an example motor control arrangement including motor control unit and a number of H-bridges, one for each of a set of stepper motors to be driven.

FIG. 7 shows an example motor control unit 520 in additional detail. The motor control unit 520 is typical of the motor control units 520*a-n*. Here, it is seen that the motor control unit 520 includes a processor 710, such as a microprocessor or other CPU, memory 712, a network interface 714, and a set of H-bridge drivers 720. The network interface 714 is coupled to the communication network 522 for communicating with the main control unit 510. For example, the motor control unit 520 receives braking profile values from the main control unit 510, and may provide status and/or sensor information to the main control unit 510. The H-bridge drivers 720 provide control signals to a set of H-bridges 730*a-n*. In an example, each of the H-bridges 730*a-n* includes four transistors (generally BJTs or MOSFETs) arranged as switches in an H-configuration. Depending on the state of the input control signal(s), each H-bridge can apply a positive voltage, a negative voltage, or zero volts to the windings of a respective stepper motor 310. In an example, the stepper motors 310 are 2-phase stepper motors which each include a pair of windings driven in parallel. To hold 2-phase stepper motors in a fixed position, both sides of both windings may be connected together. Using the arrangement shown, the motor control unit 520 can individually control a group of stepper motors 310 through the H-bridges 730*a-n*, to rotate their shafts 310*a* forward or backward any designated number of clicks, or to maintain the shafts 310*a* in a steady position.

Figure 8:
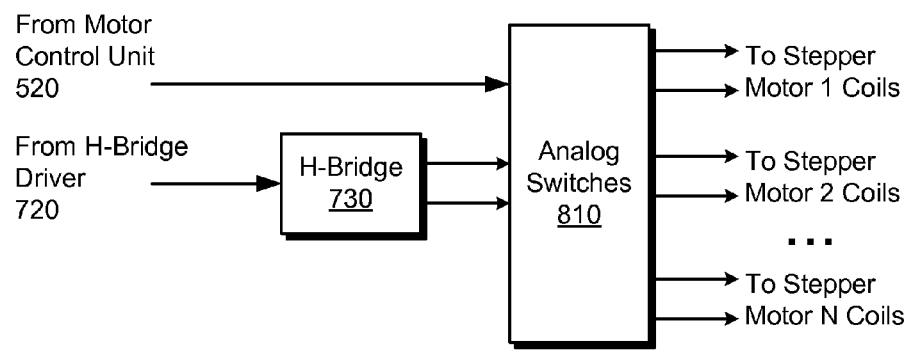
FIG. 8 is a block diagram of an example alternative drive arrangement for driving coils of stepper motors to control multiple spindles. Here, a single H-bridge is selectively switched to different stepper motors, for controlling them in turn.

FIG. 8 shows an alternative example arrangement for controlling the stepper motors 310 by the motor control unit 520. As shown, only a single H-bridge 730 is provided, driven in the usual way from the H-bridge drivers 720. Here, however, a separate control signal (or set of signals) from the motor control unit 520 drives a selector input of analog switches 810. By varying the state of the control signal(s), the analog switches 810 alternatively switch the outputs of the H-Bridge to the windings of different stepper motors 310. As the stepper motors 310 rotate their shafts 310*a* in response to pulses on their coils and do not require continuous power to be applied, the outputs H-Bridge 730 can be used sequentially to control the positions of all stepper motors 310 controlled by the motor control unit 520.

Figure 9:
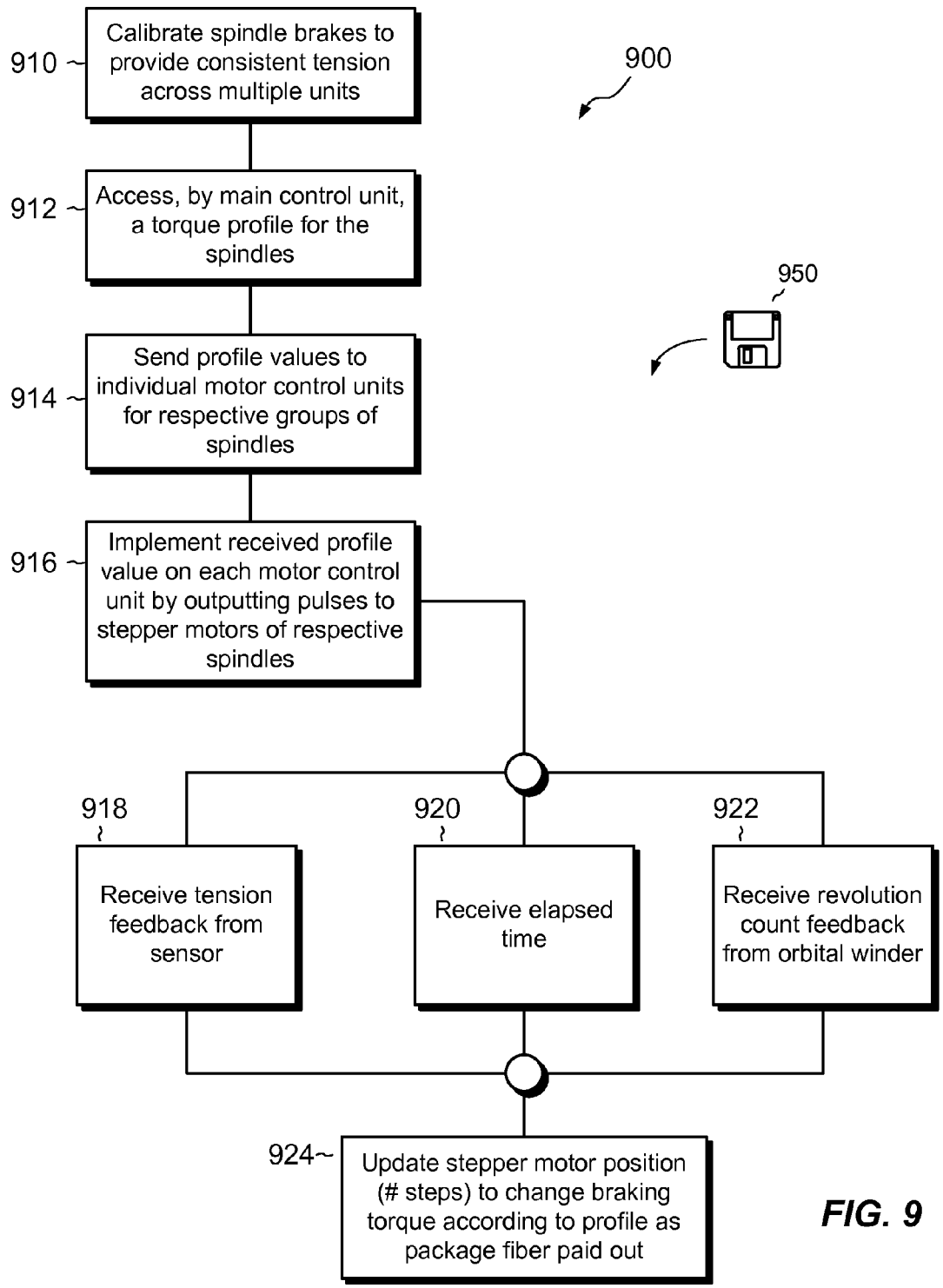
FIG. 9 is an example process for controlling tension on fiber fed from a spindle.

FIG. 9 shows an example process 900 that may be carried out in connection with one or more spindles 120 in a system for dispensing fiber, such as in the orbital winder 100. In an example, the process 900 is carried out by the controllers shown in FIGS. 5-7. The various acts of the process 900 may be ordered in any suitable way. Accordingly, embodiments may be constructed in which acts are performed in orders different from those illustrated, which may include performing some acts simultaneously, even though the acts are shown as sequential in the illustrated embodiments.

At step 910, the spindle brakes are calibrated to provide consistent tension across multiple units. For example, brakes 210 may differ from one another in the amount of braking torque they provide at different angle settings of their adjustment plates 412. To account for these differences, brakes 210 may each be adjusted to a starting position that provides a consistent value of torque. All brakes 210 are adjusted to provide this torque, and the positions of the stepper motors 310 driving the brakes are set to zero at these adjusted settings. Once this initial adjustment is made, the torques provided by different brakes 210 approximately track as the positions of the stepper motors 310 are changed. In another example, a number is recorded in the memory 612 of the main control unit 510 for each brake 210. The number represents a number of clicks of the stepper motor 310 for the respective brake 210 which are needed to zero out differences in torque between different brakes 210. The number is applied during operation of the brakes 210 (i.e., to add or subtract from a number prescribed by the braking profile) to substantially equalize torque across the different brakes 210.

At step 912, the main controller accesses a torque profile for the spindles 120. Depending on application, one torque profile may be provided for all spindles 120, or different torque profiles may be provided for different spindles 120, or for different groups of spindles 120. The torque profile(s) may be received from the user programming device 530, e.g., over a wireless connection. In an example, the torque profile specifies an initial torque value, to be used with packages 114 fully loaded with fiber, and information for varying the torque value over time or over numbers of revolutions of the serving plate 112 of the orbital winder 100.

At step 914, torque profile values are sent to individual motor control units for respective groups of spindles. For example, the main control unit 510 sends torque values (e.g., numbers of stepper motor clicks) to each of the motor control units 520*a-n* over the communication network 522.

At step 916, each motor control unit implements the received profile value by outputting pulses to the stepper motors of the respective spindles. For example, each of the motor control units 520*a-n* pulses a respective set of H-bridges 730*a-n* to effect the designated change in the positions of the stepper motors 310 driven by the H-bridges 730*a-n*. The stepper motors 310 then change the angles of the adjustment plates 412 on the respective permanent magnet brakes 210, to effect changes in torque and therefore back tension on fiber. Alternatively, a single H-bridge 730 is used for each motor control unit, and the output of the H-bridge 730 is switched to the different stepper motors 310 controlled by the motor control unit.

As the fiber 122 is paid out from the different spindles 120, various feedback signals may be generated. For example, at step 918, a tension feedback signal may be generated by a sensor coupled to the spindle 120 or to the fiber 122. The tension feedback signal may be conveyed to the main control unit 510 for processing. Also at step 920, elapsed time may be measured since fiber began being dispensed, which may be used by the main control unit 510 for adjusting braking torque. Further, at step 922, a count may be received of the number of revolutions of the serving plate 112 of the orbital winder 100 since fiber began being dispensed. Any or all of these feedback signals, or any subset thereof, may be generated.

At step 924, the stepper motor position is updated to change the braking torque according to the profile as fiber is paid out. For example, in response to fiber tension measured at step 918, the main control unit 510 may direct the motor control units 520*a-n* to change positions of the stepper motors 310 to maintain tension as prescribed by the braking profile. Also, in response to elapsed time, the main control unit 510 may direct the motor control units 520*a-n* to change positions of the stepper motors 310 as a function of time. Further, in response to revolution count feedback, the main control unit 510 may direct the motor control units 520*a-n* to change positions of the stepper motors 310 in some predetermined increment based on the linear amount of fiber actually paid out, as reported by the number of revolutions of the serving plate 112.

An improved technique has been described for maintaining tension on fiber drawn from a spindle. The technique includes incorporating a permanent magnet brake into the spindle and controlling tension of fiber paid out from the spindle by rotating an adjustment plate of the permanent magnet brake with a motor. Large changes in braking torque can be effected by driving the adjustment plate with a small, low power stepper motor. Applications requiring many spindles on rotating equipment, such as orbital winders, can thus be controlled with low power, which can be supplied conveniently with a small number of slip rings or even with a battery.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Having described certain embodiments, numerous alternative embodiments or variations can be made. For example, it has been described that the stepper motor 310 rotates the permanent magnet 414, while the flux gate 416 remains rotationally fixed to the housing 410 of the brake 210. This is merely an example, however. Alternatively, the permanent magnet 414 can be fixed to the housing 410, the flux gate 416 can be free to rotate within the housing 410, and the stepper motor 310 can operate to effect rotation of the flux gate 416.

Also, it has been shown and described that the stepper motor 310 drives the adjustment plate 212 through spur gears 314 and 316. Alternative transmission means may be used, however, such as other types of gears or a timing belt. According to one particular alternative, the stepper motor shaft 310*b* drives a worm and the worm meshes with a worm gear to rotate the adjustment plate 212. The worm-worm gear arrangement provides greater gear reduction than the spur gears 314 and 316 and may thus be preferred in some implementations.

Also, embodiments have been shown and described for use with an orbital winder. These are merely examples, however, as the principles disclosed herein may be applied in environments that do not require orbital winders.

Also, other embodiments provide for adjusting tension at a much faster rate. For example, the brake 210 may be replaced with a motor, which can apply both braking and accelerating torques. In some applications, particularly those which involve converting fibers into tapes or fabrics, it is desired to maintain tension uniformly at all times. Maintaining constant tension is a challenge for many braking systems because tension can fluctuate rapidly due to ovalization of the package 114. As the spindle 120 rotates, tension increases as an eccentric weight is lifted and decreases when it overruns. In some cases, a brake may not work since the eccentric weight applies more tension than is required, so even if the brake releases completely there is still too much tension. In these cases, it is desired to drive the package 114 when the eccentric weight is lifted and to brake the package 114 when the weight is falling. This cycle is repeated once per revolution of the spindle 120.

Figure 10:
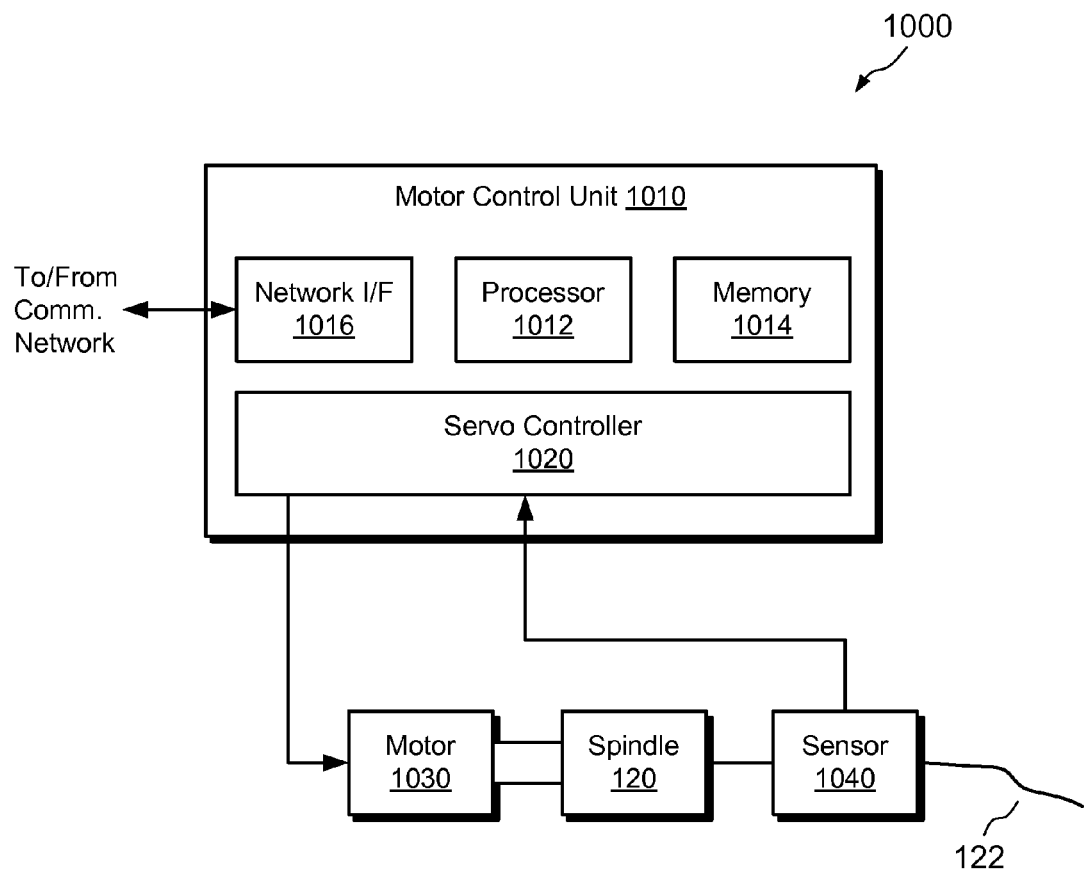
FIG. 10 is an example alternative arrangement wherein a motor control unit employs a servo controller for generating a drive signal for controlling a motor, receiving feedback indicating fiber tension, and adjusting the drive signal to maintain fiber tension at a predetermined level. This level may be a constant level, or it may be a series of different levels specified by a profile of braking torque values to vary braking torque as fiber is paid out from a spool, so as to maintain the tension on the fiber at a substantially constant level.

FIG. 10 shows an arrangement for driving a spindle 120 with a motor to achieve both lifting and braking actions. Here, a motor 1030 (e.g., a stepper motor or servo motor) may be coupled to the spindle 120 to apply driving or braking torque directly (or through gears, timing belt, etc.). In this arrangement, a motor control unit 1010 has a processor 1012, memory 1014, a network interface 1016, and a servo controller 1020. A sensor 1040 provides feedback proportional to fiber tension. The servo-controller 1020 drives the motor 1030 while monitoring the sensor 1040 in a feedback loop that is fast enough to correct for changes in tension as the package 114 rotates.

In this arrangement, the motor control unit 1010 communicates over the communication network 522 with the main control unit 510 to receive braking profile information. Here, however, tension is controlled locally, by feedback action of the servo controller 1020, while tension settings are prescribed by the braking profile received from the main control unit 510.

Further, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 950 in FIG. 9). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further still, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

Listing of Reference Numerals

| Reference Numeral | Description |
|---|---|
| 100 | Orbital |
| 110 | Stages |
| 112 | Serving plate |
| 114 | Package |
| 120 | Spindle |
| 122 | Fiber |
| 124 | Product |
| 210 | Brake |
| 212 | Expanding collets |
| 214 | Collet expander |
| 218 | Elastic bands |
| 310 | Stepper motor |
| 310a | Housing of stepper motor |
| 310b | Shaft of stepper motor |
| 312 | Gear box |
| 314 | First gear (mounted to shaft 310b of stepper motor 310) |
| 316 | Second gear (mounted to steel backing plate (adjustment plate) 412 of brake 210) |
| 410 | Brake housing |
| 412 | Steel backing plate (adjustment plate, attached to second gear 316 rotatable within housing 410) |
| 414 | Permanent magnet (fixed to steel backing plate 412 to rotate with second gear 316) |
| 416 | Flux gate (fixed to brake housing 410) |
| 418 | Gap between flux gate 416 and disc 420 |
| 420 | Disc (fixed to brake shaft 422 and rotatable within housing 410 as fiber 122 drawn off package 114 on spindle 210) |
| 422 | Brake shaft (rotatable within housing 410) |
| 424 | Bearings (allow brake shaft to rotate within housing 410) |
| 500 | Electronic system |
| 510 | Main control unit (CPU) |
| 512 | Antenna on main control unit 510 |
| 520a-520n | Motor control units (CPUs) |
| 530 | User programming device |
| 610 | Processor of main control unit 510 |
| 612 | Memory of main control unit 510 |
| 614 | Profile Database (holding torque profiles for brakes received from user programming device) |
| 620 | Wireless Interface of main control unit 510 |
| 630 | Network Interface of main control unit 510 |
| 640 | Sensor Interface of main control unit 510 |
| 650 | Sensors |
| 700 | Example motor control arrangement |
| 710 | Processor of motor control unit 520 |
| 712 | Memory of motor control unit 520 |
| 714 | Network Interface of motor control unit 520 |
| 720 | H-bridge drivers |
| 730a-730n | H-bridges for driving coils of respective stepper motors (generally 2 per coils per stepper). H-bridge can short the two coils of any stepper motor together to prevent movement and hold motor in established position) |
| 800 | Alternative example stepper motor drive arrangement |
| 810 | Bank of analog switches for switching a single H-bridge 730 to coils of multiple stepper motors. Analog switches connect H-bridge 730 to coil of given stepper motor. H-bridge 730 pulses coil to establish angular setting; switches 810 reprogrammed to connect to coils of different stepper motor; H-bridge 730 pulse those coils, and so forth, until a set of stepper motors are configured with desired braking torque for multiple brakes 210. |
| 900 | Example process for dispensing fiber with controlled tension |
| 910-924 | Example steps of process 900 |
| 950 | Non-transient computer-readable medium for storing instructions which, when executed on a controller including a set of processors and memory, perform some or all of the process 900. |
| 1000 | Example alternative motor control arrangement |
| 1010 | Alternative motor control unit |
| 1012 | Processor of alternative motor control unit |
| 1012 | Memory of alternative motor control unit |
| 1014 | Network interface of alternative motor control unit |
| 1020 | Servo Controller |

-continued

Listing of Reference Numerals

| Reference Numeral | Description |
|---|---|
| 1030 | Motor |
| 1040 | Sensor (tension, torque, etc.) |

What is claimed is:

1. A method of dispensing fiber comprising:
receiving stepper motor drive signals;
varying an angular position of a stepper motor shaft in response to the stepper motor drive signals; and
varying, in response to the angular position of the stepper motor shaft, an angular position of an adjustment plate of a permanent magnet brake relative to a housing of the permanent magnet brake, to vary the back tension on a fiber being paid out from a spindle coupled to the permanent magnet brake;
wherein varying the angular position of the adjustment plate of the permanent magnet relative to the housing of the permanent magnet brake varies the angular position of the adjustment plate relative to a flux gate within the housing and fixedly attached to the housing.

2. The method as recited in claim 1, further comprising updating the angular position of the stepper motor shaft as fiber is paid out from the spindle.

3. The method as recited in claim 2, further comprising receiving input designating an amount of fiber paid out, wherein updating the angular position of the stepper motor shaft includes updating the angular position according to a profile that prescribes different angular positions for different amounts of fiber paid out.

4. The method of claim 1, wherein varying the angular position of the adjustment plate effects rotation of a flux gate relative to a permanent magnet within the housing.

5. The method of claim 1, wherein the stepper motor shaft extends from a stepper motor, and wherein the method further comprises (i) applying power to the stepper motor to vary the back tension on the fiber being paid out from the spindle and (ii) applying no power to the stepper motor when maintaining the back tension of the fiber being paid out from the spindle at a constant level.

6. A method of dispensing fiber, comprising:
receiving, by a main control unit mounted to a serving plate of an orbital winder, a wireless signal designating a braking profile for paying out fiber from multiple spindles of the orbital winder;
transmitting profile information including at least a subset of the braking profile to each of multiple motor control units on the serving plate of the orbital winder; and
generating, by each motor control unit in response to the profile information transmitted to the motor control unit, stepper motor drive signals for each of the spindles,
wherein the method further comprises, for each of the spindles:
receiving the stepper motor drive signals;
varying an angular position of a stepper motor shaft in response to the stepper motor drive signals; and
varying, in response to the angular position of the stepper motor shaft, an angular position of an adjustment plate of a permanent magnet brake relative to a housing of the permanent magnet brake, to vary the back tension on a fiber being paid out from a spindle coupled to the permanent magnet brake.

7. The method of claim 6, wherein receiving the signal designating the braking profile comprises receiving a wireless signal providing the braking profile from a portable electronic device.

8. The method as recited in claim 7, further comprising, for each of the spindles, updating the angular position of the stepper motor shaft in accordance with the profile information as fiber is paid out from the spindle.

9. The method as recited in claim 8, further comprising, for each of the spindles:
generating a feedback signal that provides a measure of fiber tension; and
updating the angular position of the stepper motor shaft in response to the feedback signal to maintain the fiber tension substantially at a level specified by the profile information.

10. The method as recited in claim 8, further comprising, for each of the spindles:
generating a feedback signal that provides a count providing a number of revolutions of the serving plate of the orbital winder; and
updating the angular position of the stepper motor shaft in response to the feedback signal to maintain the fiber tension substantially at a level specified by the profile information.

11. The method as recited in claim 8, further comprising powering the main control unit and the motor control units through a single pair of slip rings.

12. The method as recited in claim 8, further comprising powering the main control unit and the motor control units through a set of batteries mounted onto the serving plate of the orbital winder.

13. The method as recited in claim 8, wherein generating the stepper motor drive signals includes applying timed pulses to an H-bridge for driving a pair of coils of the stepper motor.

14. The method of claim 13, wherein the H-bridge generates output signals, and wherein the generating the stepper motor drive signals further includes switching the output signals for the H-bridge sequentially to multiple stepper motor coils.

* * * * *

UNITED STATES PATENT AND TRADEMARK OFFICE
CERTIFICATE OF CORRECTION

PATENT NO. : 9,457,985 B1
APPLICATION NO. : 13/792742
DATED : October 4, 2016
INVENTOR(S) : James L. Gallagher It is certified that error appears in the above-identified patent and that said Letters Patent is hereby corrected as shown below:

In the Claims

Claim 1, Column 11, Line 22, "plate of the permanent magnet relative to the housing of" should read -- plate of the permanent magnet brake relative to the housing of --

Signed and Sealed this
Twentieth Day of December, 2016

Michelle K. Lee
*Director of the United States Patent and Trademark Office*